(12) United States Patent
Perry et al.

(10) Patent No.: US 6,493,336 B1
(45) Date of Patent: Dec. 10, 2002

(54) SYSTEM OPTIMIZED ALWAYS ON DYNAMIC INTEGRATED SERVICES DIGITAL NETWORK

(75) Inventors: Mark J. Perry, Cary, NC (US); Patrick J. Dagert, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/281,503

(22) Filed: Mar. 30, 1999

(51) Int. Cl.[7] .............................................. H04L 12/66
(52) U.S. Cl. ........................ 370/352; 370/524; 709/228
(58) Field of Search ................................. 370/352–356, 370/464, 465, 524, 252, 254; 709/227, 228, 220, 221, 226; 379/93.01

(56) References Cited

U.S. PATENT DOCUMENTS

| | | | | |
|---|---|---|---|---|
| 5,091,920 A | * | 2/1992 | Ikeda et al. .................... 327/68 |
| 5,951,637 A | * | 9/1999 | Kuzma ........................ 370/260 |
| 6,098,091 A | * | 8/2000 | Kisor .......................... 709/100 |
| 6,377,554 B1 | * | 4/2002 | Farnsworth et al. ........ 370/252 |
| 6,438,141 B1 | * | 8/2002 | Hanko et al. ................ 370/477 |
| 2001/0040899 A1 | * | 11/2001 | Carter et al. ................ 370/477 |

* cited by examiner

Primary Examiner—Ajit Patel
(74) Attorney, Agent, or Firm—Nortel Networks

(57) ABSTRACT

The present invention provides a method and apparatus used in an AO/DI networking service that automatically changes thresholds that increase or decrease bandwidth to cause a corresponding change in the rate of data transfer capacity. The AO/DI networking service uses apparatus that comprises a circuit switched network having an end office with a network management center that monitors the circuit switched network. A computer and a packet switched network are connected to the circuit switched network. An ISP connected to the packet switched network and the end office is used for determining the status of telephone circuits in the circuit switched network serving both the computer and the ISP. Once this status is determined, the AO/DI automatically changes thresholds for increasing and decreasing bandwidth thereby effecting a corresponding change in the rate of data transfer capacity for an AO/DI subscriber.

63 Claims, 2 Drawing Sheets

SYSTEM OPTIMIZED ALWAYS ON DYNAMIC INTEGRATED SERVICES DIGITAL NETWORK

BACKGROUND OF THE INVENTION

1. Field of the Invention

This invention is related to an Always on Dynamic Integrated Services Digital Network (AO/DI) service and, more particularly, for automatically changing the Always-On-Dynamic Integrated Services Digital Network's (AO/DI's) thresholds that increase or decrease in bandwidth for effecting a corresponding change in the rate of data transfer capacity for an AO/DI subscriber.

2. Description of the Problem Solved

With the increased use of the Internet, World Wide Web, and other networks, the need for increasing access bandwidth to these networks has grown. The Integrated Services Digital Network (ISDN) protocol architecture using a Basic Rate Interface (BRI) user interface is widely used for network access and is relatively high speed. BRI consists of one D-channel and two B-channels. The D-channel has a bandwidth of 16 kilo-bytes-per-second (kbps). The D-channel transfers data through a packet switched network to the Internet (or other Networks). The D-channel is always active and, therefore, is primarily used for transfer of data that does not require high bandwidth and to exchange control information between the user and the network for call establishment and termination. The two B-channels are bearer communication channels. Each B-channel can carry voice, video or packet data at a bandwidth rate of 64 kbps. To transfer data at a rate faster than 64 kbps through a network from one end-point to another destination, the two B-channels in a BRI can be aggregated to provide a total bit rate of 128 kbps. The technique of aggregating two B-channels is called an aggregation of multiple links, and is known as inverse multiplexing. Inverse multiplexing is more thoroughly described in the article entitled "The PPP Multilink Protocol," RFC 2125, March 1997, and which is incorporated herein by reference. The B-channels are carried through a circuit switched network and are not always on, but are seized and released depending on the need for access capacity. The D-channel is used to carry the requests for seizing and releasing B-channels.

For example, the D-channel can be used to transmit messages that setup a telephone call (a request for a B-channel) through a network from a calling party to a called party. The D-channel can also transmit packet data through the network to notify a calling party that the called party's telephone is ringing and whether the called party has answered the telephone call.

Although data can be transferred faster through a network by aggregating two B-channels of a BRI to serve one end user, it is recognized that it does have a cost. For example, aggregating two B-channels requires the use of two Digital Signal Level 0 (DS0) circuits in the circuit switched network, instead of one DS0. This results in higher end user, Local Exchange Carrier (LEC) and Internet Service Provider (ISP) cost. Furthermore, it is recognized that end users do not always need the B-channels, when they are reading an e-mail message or have walked away from the computer.

To control these end user, LEC and ISP high costs and still provide two channel bandwidth when needed, the present invention employs AO/DI networking services for fast transfer of data through a network without these higher costs. AO/DI networking services provide an always available connection via the D-channel of BRI to packet-based networks through the Wide Area Network (WAN). AO/DI networking services reduce the costs for the end user by using the D-channel to make low-speed data transfers. For ISPs, AO/DI networking removes a significant amount of holding time from the circuit switched connections (B-channels). Since the D-channel is always available, the customer premises equipment (CPE) can use the D-channel to pass Multilink Point-to-Point and TCP/IP protocols encapsulated in X.25 protocols.

Optionally, when D-channel bandwidth exceeds a defined threshold, the end user computer places one or more ISDN B-channel calls to increase bandwidth. When bandwidth requirements fall below a defined threshold, the B-channel or B-channels are released. AO/DI networking services use the D-channel of BRI to maintain a constant virtual connection to a central office switch in the circuit switched network. In this mode, the 16 kbps D-channel is capable of receiving and transmitting data, in addition to control signals, at 9.6 kbps. This bandwidth is quite suitable for transforming e-mail, stock quotes or news updates. When higher speed data transfers are required, such as downloading Web pages, one or both of the B-channels in the BRI can be activated automatically to transfer the data at bandwidths of 64 kbps or 128 kbps, respectively.

The AO/DI networking configuration uses a Bandwidth Allocation Protocol (BAP) and its associated control protocol, the Bandwidth Allocation Control Protocol (BACP), to transfer data and commands via the network between an end user and the end user's serving ISP. BAP provides a means (via datagrams) to implement dynamically adding and/or removing individual links (B-channels) from a multilink bundle, such as BRI.

BAP and BACP provide a flexible yet robust way of managing bandwidth between two end users. BAP does this by defining Call-Control packets and a protocol that allows end users to coordinate the actual bandwidth allocation and de-allocation. BAP can be used to manage the number of links in a multilink bundle. BAP and BACP are well known in the art. More information about BAP and BACP may be found in the publication entitled "The PPP Multilink 10 Protocol," RFC 2125, March 1997, and which has been incorporated herein above by reference.

In operation, an end user implementing AO/DI networking services will generally need an AO/DI card. This AO/DI card is integrated with the end' user's computer and serves as the computer's interface to an ISP via a circuit switched network and a packet switched network. The AO/DI card and ISP communicates with each other using BAPIBACP. The AO/DI card has default threshold parameters set to trigger a message to the ISP, asking for agreement from the ISP to request the circuit switched network to establish certain B-channel connections from the end user's computer to the ISP. Likewise, the ISP has threshold parameters set to trigger a message to the end user, instructing the end user to request the circuit switched network to establish certain B-channel connections between the end user's computer and the ISP. These messages are sent via an already established D-channel connection between the end user's computer and the ISP. For example, if the end user is transmitting information to the ISP, based on default threshold parameters of the AO/DI card, the end user may make a request—via the D-channel—to add a B-channel. The end user makes this request to the ISP via the D-channel connection using BAP/BACP to ask if the ISP is willing to add or remove B-channels from the end user to ISP. If the ISP agrees, the end user will initiate a call (acquisition of a B-channel) or release. The AO/DI card has a threshold table that is comprised of a set of threshold parameters that are used to trigger, when a message is to be sent from the end user's computer to an ISP. This message requests agreement with the ISP for request to the LEC to add or remove B-channels from the end user to the ISP via the circuit switched network. The threshold parameters of the AO/DI card are generally set to certain default parameters before the card is integrated with a computer. These threshold parameters cannot be readily changed. For example, an AO/DI card might be set to trigger sending a message to add one B-channel of a BRI if the end user is sending data at a bandwidth of greater than 7.5 kbps through a network and to remove the B-channel when the bandwidth decreases to less than 5.0 kbps; thereby, reverting back to sending data via the D-channel. The AO/DI card might be set to trigger sending a message to add both B-channels if the end user is sending data through the network at a bandwidth of greater than 48 kbps and to remove one of the B-channels if the bandwidth decreases to less than 32 kbps.

The ISP can also advise end users on when to add or remove a B-channel.

For example, if a large file is being sent to the end user, the ISP can issue BAP messages to the end user, requesting the end user to initiate a request for a B-channel.

A common problem that might be encountered with the above mentioned method of managing bandwidth is that the end user and the ISP might not make "good" choices in requesting more or less B-channels pursuant to their threshold parameter settings. For example, AO/DI network users might want to minimize B-channel usage but still transfer data quickly through a network. Therefore, these end users would have their threshold parameters set to aggressively request extra B-channels, and to drop the B-channels if they are not heavily used for even a second. This would save telephone circuits in the circuit switched network (even when there are many available) and exhaust the circuit switched network's real-time capacity because of the large number of call attempts. The LEC sets up one B-channel at a time. If the LEC receives too many requests to set up B-channels at once, the LEC will be backlogged until it can process each request. Therefore, if end users request the LEC to setup a circuit when the LEC is having RT problems, the request will only add to the backlog in the circuit switched network, thereby causing further delays in setting up a telephone circuit and frustrating the end user. Likewise, if all the telephone circuits in the circuit switched network are in use when an end user requests a B-channel, the LEC cannot make such connection until a B-channel becomes available.

Thus, an object of this invention is to provide a way in which to notify an ISP, connected to a circuit switched network, the status of telephone circuits and real-time availability in the circuit switched network serving the ISP and the ISP's customers.

Another object of this invention is to provide a way in which to determine new threshold parameters for an AO/DI card of an end user's computer, based on the status of telephone circuits and real-time availability in the circuit switched network serving the computer containing the AO/DI card.

A further object of this invention is to provide a way in which to replace the threshold parameters of an ISP based on the status of telephone and real-time availability circuits in a circuit switched network serving the ISP.

A still fuirther object of this invention is to provide a way in which to replace the threshold parameters of an AO/DI card based on the status of telephone circuits and real-time availability in a circuit switched network serving the computer containing the AO/DI card.

It is another object of the invention to provide a way in which two new datagram types can be added to the BAP protocol which allows the exchange of parameters that drive the requests to connect and/or disconnect B-channels between an end user and an ISP via a circuit switched network.

It is a further object of this invention to provide a protocol that would contain parameters which could be used by two ends of a multilink bundle, such as a BRI, to influence the link requests.

SUMMARY OF THE INVENTION

The present invention solves the above problems by providing an enhanced AO/DI—called System Optimized AO/DI (SOAO/DI). SOAO/DI automatically updates threshold parameters of an AO/DI card integrated within a computer, based on the status of telephone circuits and real-time availability in a circuit switched network serving both the computer and the computer's serving ISP. The SOAO/DI network comprises a circuit switched network having an end office with a network management center. The network management center monitors the circuit switched network. A packet switched network is connected to the end office. The packet switched network has a packet handler. The AO/DI card is connected to both the computer and the packet handler via the end office. An ISP is connected to both the packet handler and the end office. The ISP determines the status of telephone circuits or real-time availability in the circuit switched network serving both the computer and the ISP. Alternatively, the network management center could provide information to the ISP, regarding the status of telephone circuits and real-time availability in the circuit switched network and send proper new threshold parameters for the AO/DI card and ISP threshold tables.

The method of the present invention provides a way to automatically update threshold parameters of the ISP and default threshold parameters of the AO/DI card. The threshold parameters of the AO/DI card defmes when the AO/DI card requests an ISP computer to open or close at least one B-channel in the circuit switched network between the computer and the ISP. The ISP or network management center determines the status of telephone circuits and real-time availability of the circuit switched network serving both the ISP and the computer. Accordingly, either the ISP or network management center can determine the new threshold parameters for replacing threshold parameters of both the AO/DI card and the ISP. Once the new threshold parameters have been determined, the ISP automatically replaces its threshold parameters with the new threshold parameters. The ISP then builds a message containing the new threshold parameters and sends the message to the computer, whereby the computer automatically replaces the threshold parameters of its AO/DI card with the new threshold parameters.

BRIEF DESCRIPTION OF THE DRAWINGS

These and other features, aspects and advantages of the present invention will become better understood with regard to the following description, appended claims and accompanying drawings where:

DETAILED DESCRIPTION OF PREFERRED EMBODIMNT OF THE INVENTION

The SOAO/DI network for this invention is a network that employs AO/DI technology. An end user is defined herein as a party that has a computer connected to the SOAO/DI network. The legend for the various states of the SOAO/DI network are identified in Table 1.1 as follows:

TABLE 1.1

SOAO/DI Network States

| | |
|---|---|
| (0,0) | 0 B-channels are in use and 0 B-channels are wanted |
| (0,1,R) | 0 B-channels are in use and a request to attempt acquisition of a B-channel has been made |
| (0,1,A) | 0 B-channels are in use, 1 B-channel has been requested and an attempt to acquire a B-channel is being made |
| (1,1) | 1 B-channel is in use, and 1 B-channel is all that is currently wanted |
| (1,0) | 1 B-channel is in use, but 0 B-channels is wanted, a request to drop the B-channel has been made |
| (1,2,R) | 1 B-channel is in use and a request to attempt acquisition of a second B-channel is being made |
| (1,2,A) | 1 B-channel is in use, 1 B-channel has been requested and an attempt to acquire a second B-channel is being made |
| (2,2) | 2 B-channels are in use, and that is what is wanted |
| (2,1) | 2 B-channels are in use, but 1 B-channel is wanted |

The BAP/BACP messages are identified in Table 1.2 as follows:

TABLE 1.2

BAP/BACP Configurations

| | |
|---|---|
| Call-Request | (CR) |
| Call-Response that is ACKed | (CR--ACK) |
| Call-Response that is NACKed | (CR--NACK) |
| Callback-Request | (CBR) |
| Callback-Response that is ACKed | (CBR--ACK) |
| Callback-Response that is NACKed | (CBR--NACK) |
| Link-Drop-Query-Request | (LDR) |
| Link-Drop-Query-Response that is ACKed | (LDR--ACK) |
| Link-Drop-Query-Response that is NACKed | (LDR--NACK) |
| Call-Status-Indication that indicates a success | (CS--Success) |
| Call-Status-Indication that indicates a failure | (CS--Failure) |

Figure 1:
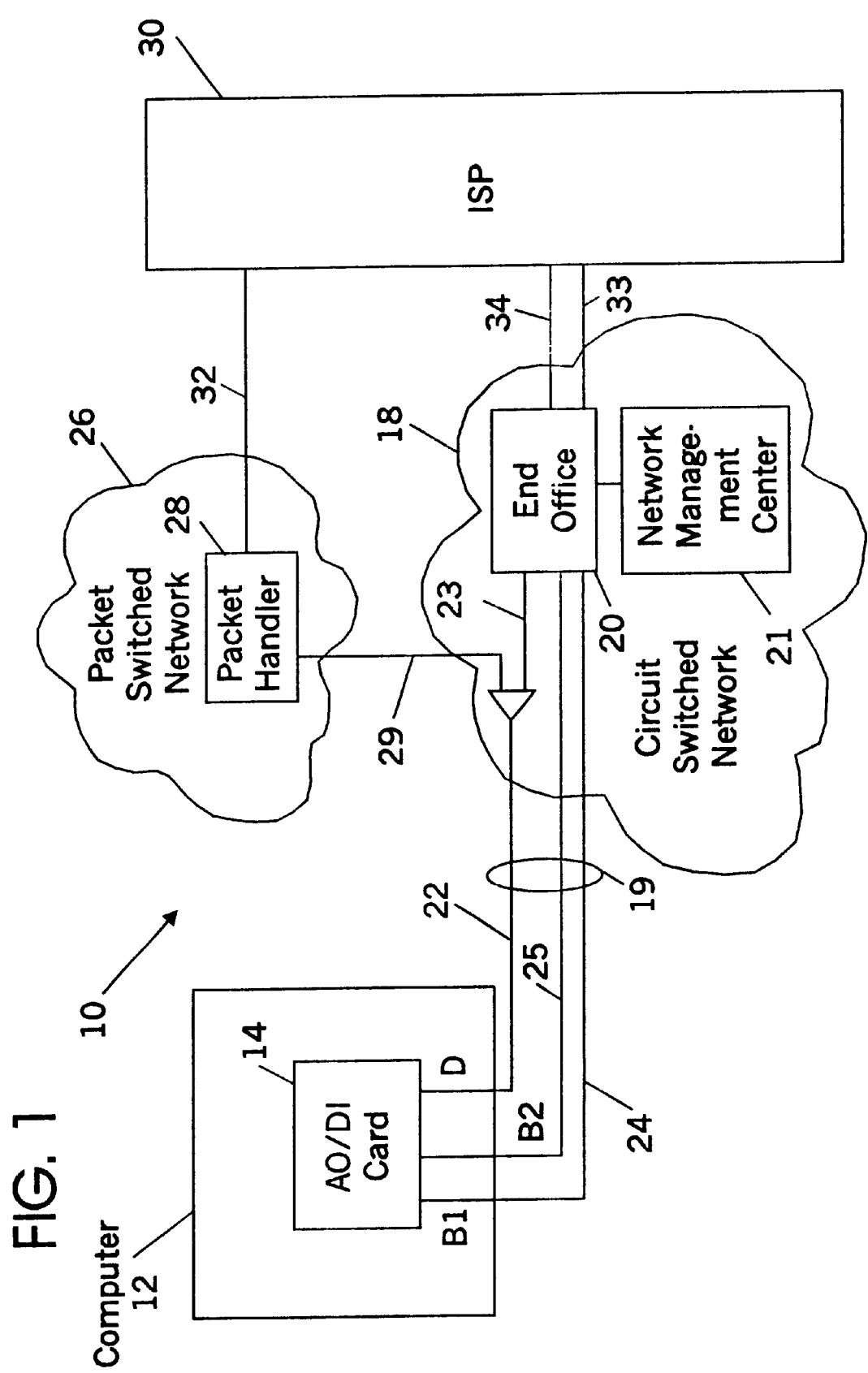
FIG. 1 is a diagram of a SOAO/DI network in accordance with the invention.

FIG. 1 is a diagram that illustrates the SOAO/DI network 10 in accordance with the invention. The environment generally depicted by 10 comprises a computer 12. Computer 12 is a general purpose computer having the capability of establishing connections to both a packet switched network and a circuit switched network. Computer 12 has an internally attached AO/DI card 14. AO/DI card 14 is a standard commercially available computer card and serves as the interface for computer 12 to communicate with other computers (not shown) connected to circuit switched network 18. AO/DI card 14 also serves as a terminal adapter that adapts devices such as, personal computers, workstations and other equipment to work with the ISDN. AO/DI card 14 converts signals it receives from computer 12 to ISDN digital signals. The digital signals are then transferred to circuit switched network 18. When AO/DI card 14 receives digital signals from circuit switched network 18, AO/DI card 14 converts and transfers them to computer 12. Alternatively, computer 12 may have a separately built-in terminal adapter, or other ISDN compliant equipment, which would not require the use of AO/DI card as a terminal adapter.

Referring still to FIG. 1, AO/DI card 14 is connected to circuit switched network 18 through a BRI 19. Circuit switched network 18 has an end office 20 connected to AO/DI card 14 by a D-channel of BRI 19, shown as lines 22 and 23. End office 20 is connected to AO/DI card 14 by the two B-channels of BRI 19, shown as lines 24 and 25. End office 20 has a network management center 21. Network management center 21 is a computer system that monitors circuit switched network 18. Circuit switched network 18 may be the Public Switched Telephone Network.

Still referring to FIG. 1, a packet switched network 26 has a packet handler 28 connected to circuit switched network 18 by the D-channel of BRI, shown as line 29. Packet switched network 26 is a network designed to carry data in the form of packets. Packet handler 28 handles the transfer of packet data through packet switched network 26.

Still referring to FIG. 1 packet handler 28 is connected to ISP 30, shown as line 32. ISP 30 is a vendor who provides access for computer 12 to packet switched network 26. ISP 30 generally provides a core group of Internet utilities and services, such as e-mail. ISP 30 is also connected to end office 20 via circuit switched connections, shown as lines 33 and 34, which are essentially B-channels in circuit switched network 18 that are assigned to ISP 30. End office 20, via its telephone switches (not shown) can connect B-channels shown as lines 24 and 25 to B-channels shown as lines 33 and 34, respectively, to establish B-channel connections between computer 12 and ISP 30. Once these B-channel connections are established, computer 12 and ISP 30 can directly transfer data to each other via circuit switched network 18.

Figure 2:
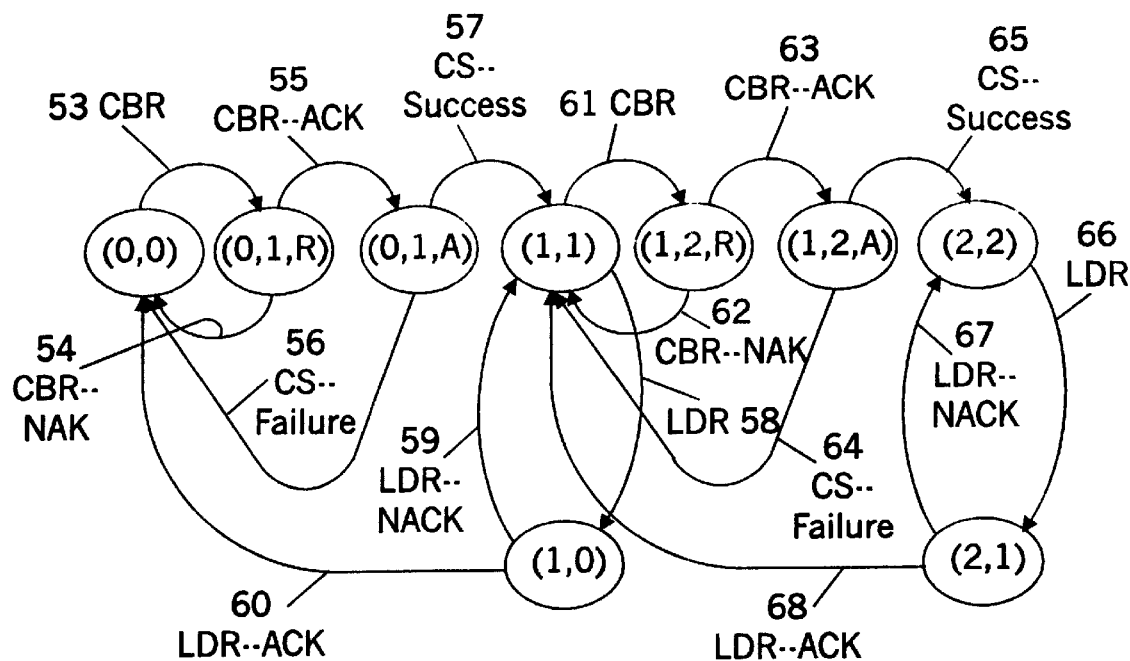
FIG. 2 is a high level flow chart that illustrates how an ISP initiates a request using BAP/BACP to an AO/DI card to increase or decrease bandwidth.
Figure 3:
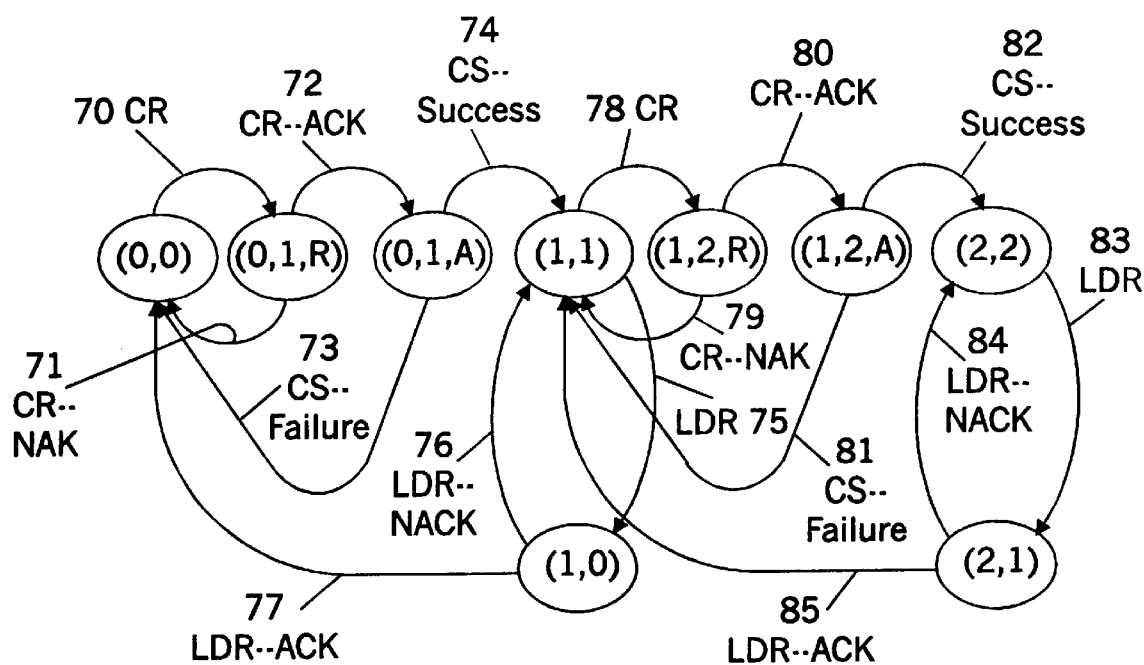
FIG. 3 is a high level flow chart that illustrates how an end user via a computer initiates a request using BAP/BACP to increase or decrease bandwidth.

FIG. 2 and FIG. 3 show flow charts that illustrate a high level view of how computer 12 interacts with ISP 30 in SOAO/DI network 10 using BAP/BACP. Both FIG. 2 and FIG. 3 use diagrams, state descriptions and event lists to describe the main stream states and transactions that occur between computer 12 and ISP 30. All control communications transferred between computer 12 and ISP 30, to connect or drop B-channels, are made via the D-channel, shown as lines 22, 29 and 32 (FIG. 1).

Referring specially to FIG. 2, there is illustrated the mainline transitions of ISP 30 initiating a command to computer 12 to increase bandwidth in SOAO/DI network 10. Once the PPP connection has been established over the D-channel from computer 12 to ISP 30 via circuit switched network 18 and packet switched network 26, the current state of SOAO/DI network 10 is (0,0). Assuming that computer 12 has requested a file download from the Internet, and assuming that ISP 30 determines that a B-channel is needed to quickly download the file to computer 12, ISP 30 then generates a CBR 53 using BAP. CBR 53 is transferred to computer 12 via the D-channel connection. The state of SOAO/DI network 10 is now (0,1,R). If computer 12, however, does not wish to establish a B-channel connection, computer 12 will send a CBR—NAK 54 to ISP 30, thereby maintaining the state (0,0). If computer 12 wishes to establish a B-channel to quickly download the information from the Internet at a bandwidth of 64 kbps, computer 12 will acknowledge CBR 53 by sending a CBR—ACK 55 to ISP 30. The state of SOAO/DI network 10 is now (0,1,A). Computer 12 now makes a call attempt. If the LEC does not have resources to complete the call, then computer 12 issues a CS-Failure 56 to ISP 30. The state of SOAO/DI network 10 then returns to (0,0). If computer 12 initiates a call to end office 20 (FIG. 1) and assuming end office 20 has the resources to complete the call, a B-channel connection is made between computer 12 and ISP 30. For example, the telephone switches (not shown) of end office 20 will connect lines 24 and 33 to establish the B-channel connection between computer 12 and ISP 30 (See FIG. 1). Computer 12 sends a CS—Success 57 to ISP 30. The state of SOAO/DI network is now (1,1). SOAO/DI network 10 has established a B-channel connection, as requested by computer 12. After the file has been downloaded to computer 12, ISP 30 sends a LDR 58 to computer 12 to drop the B-channel. The state of SOAO/DI network 10 is now (1,0). If the request to drop a B-channel is not agreed to, computer 12 sends a LDR—NACK 59 to ISP 30. The state of SOAO/DI network 10 is (1,1). If the request to drop the B-channel is agreed to, computer 12 sends a LDR—ACK 60 to ISP 30. The state of SOAO/DI network is now back to (0,0).

Still referring to FIG. 2, if SOAO/DI network 10 desires to connect both B-channels between computer 12 and ISP 30, after the first B-channel has been connected, to increase the bandwidth to 128 kbps, a similar transition occurs as in connecting the first B-channel. ISP 30 both generates and sends a CBR 61 to computer 12. The state of SOAO/DI network 10 is now (1,2,R). If CBR 61 is not agreed to by the end user, computer 12 sends a CBR—NAK 62 to ISP 30. The state of SOAO/DI network 10 remains at (1,1). If CBR 61 is agreed to, computer 12 sends CBR—ACK 63 to ISP 30. The state is now (1,2,A). If the call attempt for an additional B-channel is unsuccessful, a CS—Failure 64 is sent and SOAO/DI network 10 returns to state (1,1). If Computer 12 is successful in placing a call for the additional B-channel—end office 20 has to have the resources to complete the call—the second B-channel is added, and a CS—Success 65 is sent to the ISP 30. The state is now (2,2). Now suppose the file has been downloaded, ISP 30 sends a LDR 66 to computer 12 to drop the second B-channel. The state is now (2,1). If the request to drop the second B-channel is not agreed to, computer 12 sends a LDR—NACK 67. The state of SOAO/DI network 10 is (2,2). If the request is agreed to, computer 12 sends a LDR—ACK 68 to ISP 30. The state of the SOAO/DI network 10 is now back to (1,1).

Referring now to FIG. 3, there is illustrated a sequence of transitions of an end user initiated call to increase bandwidth. For example, assuming computer 12 is sending an e-mail message to another computer (not shown) connected to circuit switch network 18 and the state of SOAODI network 10 is (0,0), computer 12 will send a CR 70 to ISP 30 using BAP/BACP. The state of SOAO/DI network 10 is now (0,1,R). If ISP 30 does not accept CR 70, then ISP 30 sends a CR—NAK 71 to computer 12. The state remains at (0,0). If ISP 30 accepts CR 70, then ISP 30 sends a CR—72 message to computer 12. The state is now (0,1,A). If the end-user is not successful with the call attempt then computer 12 sends a CS-Failure 73 to—ISP 30 and the state returns to (0,0). If the call computer 12 initiates is successful,—end office 20 would have to have resources to complete the call—a B-channel is added, and computer 12 sends a CS—Success 74 to ISP 30. The state is now (1,1). Now suppose that the e-mail has been sent and computer 12 wishes to drop the B-channel, computer 12 sends a LDR 75 to ISP 30. The state is now (1,0). If the request to drop a B-channel is not agreed, ISP 30 will send a LDR—NACK 76 to computer 12. The state now returns to (1,1). If ISP 30 accepts LDR 75, then ISP 30 will send an LDR—ACK 77 to computer 12. The state is now back to (0,0).

Referring still to FIG. 3, assuming that computer 12 desires to connect both B-channels to increase the bandwidth to 128 kbps, a similar transition occurs. Computer 12 will generate and send a CR 78 to ISP 30 using BAP/BACP. The state is now (1,2,R). If ISP 30 does not accept the request, then ISP 30 sends a CR—NAK 79 to computer 12. The state remains at (1,1). If ISP 30 accepts the call request, ISP 30 will send a CR—ACK to computer 12. The state is now (1,2,A). Computer 12 now attempts a call. If the call is not successful, computer 12 will send a CS—Failure 81 to ISP 30. The state returns to (1.1). If the call is successful —end office 20 has the resources to complete the call—a B-channel is added, and computer 12 then sends a CS—Success 82 to ISP 30. The state is now (2,2).

Still referring to FIG. 3, now suppose that the e-mail message has been sent, computer 12 sends a LDR 83 to ISP 30 requesting that the B-channel be dropped. The state is now (2,1). If the request to drop a B-channel is not agreed to, ISP 30 will send an LDR—NACK 84 to computer 12. The state returns to (2,2). If the request to drop is agreed to, ISP 30 will send an LDR—ACK 85 to computer 12. The state is now back to (1,1). At this point, we assume that the default threshold parameters of the AO/DI card 14 and the threshold parameters of ISP 30 are the same. Table 1.3, by way of example, illustrates a possible type and set of threshold parameters.

TABLE 1.3

| | Threshold Parameters | |
|---|---|---|
| B-channels | Add Channel Demand | Remove Channel Demand |
| B1 | 7.5 kbps | 5.0 kbps |
| B2 | 20 kbps | 15 kbps |

As shown in Table 1.3, computer 12 would not send a CR 70 unless computer 12 is sending out information at a bandwidth of greater than 7.5 kbps (as determined over given period of time). If computer 12 is sending out information at a bandwidth of less than 7.5 kbps, computer 12 would simply store the information in its buffer (not shown) and slowly send the information out through the D-channel connection. However, if the information is sent at a bandwidth of greater than 7.5 kbps, computer 12 will send CR 70 to ISP 30, requesting ISP 30 to establish a B-channel connection between computer 12 and ISP 30. If computer 12 is sending information out at a bandwidth of greater than 20 kbps, computer 12 will send CR 78 to the ISP 30, requesting ISP 30 to establish a second B-channel connection. If the rate of transfer then drops below 15 kbps, then computer 12 will send LRD 83 to drop the second B-channel. Likewise, if the rate of transfer drops below 5 kbps, computer 12 will send LDR 75 to the ISP 30, requesting ISP 30 to drop the first B-channel, thereby reverting to transferring data via the D-channel.

Now if computer 12 is receiving information at a bandwidth of less than 7.5 kbps, ISP 30 would simply store the information in its buffer (not shown) and slowly send the information to computer 12 through the D-channel connection. However, if the information is being sent to computer 12 at a bandwidth of greater than 7.5 kbps, ISP 30 will send CBR 53 to request computer 12 to request computer 12 to establish a B-channel connection. If information is being sent to computer 12 at a bandwidth of greater than 20 kbps, then ISP 30 will send CBR 61 to computer 12 to request computer 12 to establish the second B-channel connection. If the rate of transfer then drops below 15 kbps, ISP 30 will send LDR 66 to drop the second B-channel. Likewise, if the rate of transfer drops below 5 kbps, ISP 30 will send LDR 58 to computer 12 requesting computer 12 to authorize ISP 30 to drop the first B-channel, thereby reverting to the D-channel.

Thus, SOAO/DI network 10 can be used to provide a way to modify the threshold parameters of both the AO/DI card 14 and ISP 30, based on the status of telephone circuits and real-time availability in circuit switched network 18. This is accomplished by adding an extension to the BAP/BACP protocols that are used to transfer messages between computer 12 and ISP 30. Essentially, ISP 30 determines the status of its telephone circuits and real-time availability of its telephone circuits circuit switched network 18. Based on the status of telephone circuits and real-time availability, ISP 30 generates new threshold parameters for both ISP 30 and AO/DI card 14 that trigger CBRs 53 and 61 and CR 70 and 78, respectively.

Table 1.4 below, by way of example, illustrates a new set of threshold parameters determined by ISP 30.

TABLE 1.4

New Set of Threshold Parameters

| B-channels | Add Channel Demand | Remove Channel Demand |
|---|---|---|
| B1 | 10 kbps | 8.0 kbps |
| B2 | 48 kbps | 32 kbps |

The new threshold parameters will be used to replace the threshold parameters of AO/DI card 14 and ISP 30 as shown in Table 1.3. ISP 30 will first replace its existing threshold parameters with those of Table 1.4. ISP 30 will generate a bandwidth-on-demand-update message, which is an extension of BAP/BACP. The bandwidth-on-demand-update message contains the new threshold parameters, as shown in Table 1.4. This message is sent to computer 12. Computer 12 automatically replaces the default threshold parameters of AO/DI card 14 with the new threshold parameters. Computer 12 then sends a bandwidth-on-demand-threshold-update-response message to ISP 30, notifying ISP 30 that it has replaced the default threshold parameters of AO/DI card 14 with the new threshold parameters. Now with the new threshold parameters, computer 12 and ISP 30 would not send CR 70 or CBR 53, respectively, unless the bandwidth requirements exceed 10 kbps. Likewise, neither a CR 78 nor CBR 61 would be triggered unless the bandwidth requirements exceeds 48 kbps. LDRs 66 and 83 would not be sent unless the bandwidth requirements decrease to less than 32 kbps. LDRs 58 and 75 would not be sent unless the bandwidth requirements decrease to less than 8 kbps.

Alternatively, network management center 21 is used to determine the status of all telephone circuits associated with end office 20 in circuit switched network 18 and real-time availability, particularly the ones serving ISP 30 and computer 12. Network management center 21 will send messages to ISP 30, informing ISP 30 of the status of telephone circuits in circuit switched network 18. Network management center 21 will also determine the new threshold parameters for both ISP 30 and AO/DI card 14. By way of example, Table 1.5 below illustrates messages that are sent between network management center 21 and ISP 30. Based on the information sent to ISP 30, ISP 30 will decide whether new threshold parameters will be sent for both ISP 30 and AO/DI card 14.

TABLE 1.5

Network Management Center/ISP Messages

| Network OK | Sent from network management center 21 to ISP 30, meaning that the entire network is OK and no new threshold values will be given. |
| Network OK Response | Sent from ISP 30 to network management center 21 in response to a Network OK. |
| Network Problem | Sent from network management center 21 to ISP 30, meaning that the entire network has problems and new threshold parameters will be sent for all AO/DI connections. |
| Network Problem Response | Sent from ISP 30 to network management center 21 in response to a Network Problem. |
| Partial Network Problem | Sent from network management center 21 to ISP 30, meaning that there are some connections in the network that have problems. A list of new threshold parameters is sent for each end user that has a problem in the network. |
| Partial Network Problem Response | Sent from ISP 30 to network management center 21 in response to a Partial Network Problem. |

For example, if SOAO/DI network 10 is not having any problems setting up telephone circuits, network management center 21 will send a network OK to ISP 30, notifying ISP 30 that circuit switched network 18 is not having any trouble with telephone circuits and real-time availability. Therefore, ISP 30 will not send new threshold parameters to AO/DI card 14. If SOAO/DI network 10 is having problems setting up telephone circuits, network management center 21 will either send a network problem message or partial network problem message indicating that the entire SOAO/DI network 10 is having problems or part of SOAO/DI network 10 is having problems, respectively. Both the network problem message and partial network problem message will contain new threshold parameters for both ISP 30 and AO/DI card 14. ISP 30 will send either a corresponding network problem response message or partial network problem response message to network management center 21. ISP 30 will then update its threshold parameters with these new threshold parameters. ISP 30 will then package the new threshold parameter in a bandwidth-on-demand-threshold-update message and send the bandwidth-on-demand-threshold-update message to computer 12. Computer 12 will update the default threshold parameters of AO/DI card 14. Computer 12 will send a bandwidth-on-demand-threshold-update-response message to ISP 30.

The invention recognizes that the method of triggering CRs 70 and 78 or CBRs 53 and 61 might be measured in ways other than the transmission bandwidth, as described in Table 1.3 and Table 1.4. By way of example, Table 1.6 and Table 1.7 illustrate additional methods to trigger a CR and CBR.

TABLE 1.6

Threshold Parameters

| B-channels | Add Channel Bits Occupied In Buffer | Remove Channel Bits Occupied In Buffer |
|---|---|---|
| B1 | 60,000 bits | 40,000 bits |
| B2 | 120,000 bits | 80,000 bits |

TABLE 1.7

Threshold Parameters

| B-channels | Add Channel Time to Clear | Remove Channel Time to Clear |
|---|---|---|
| B1 | 5 Seconds | 3 Seconds |
| B2 | 15 Seconds | 10 Seconds |

In Table 1.6, the threshold parameters could be measured by how many bits of data are stored in the buffer (not shown) of computer 12 (if computer 12 is sending data) or in the buffer (not shown) of ISP 30 (if the computer 12 is receiving data). For example, if computer 12 is sending data and more than 60,000 bits of data are stored in the buffer (not shown) of computer 12, then computer 12 will send a CR 70. If more than 120,000 bits of data is stored in the buffer (not shown) of computer 12, then computer 12 will send CR 78. If the amount of bits stored in the buffer decreases to less than 80,000 bits, then computer 12 will send LDR 83 to revert back to a single B-channel. Likewise, if the amount of bits stored in the buffer further decreases to 40,000 bits, then computer 12 will send LDR 75 to revert back to the single D-channel.

Likewise, if computer 12 is receiving data and more than 60,000 bits of data is stored in the buffer (not shown) of ISP 30 then ISP 30 will send CBR 53. If more than 120,000 bits of data is stored in the buffer, ISP 30 will send CBR 61. If the amount of bits stored in the buffer decreases to less than 80,000 bits, ISP 30 will send LDR 66 to revert back to a single B-channel. Likewise, if the amount of bits stored in the buffer further decreases to 40,000 bits, ISP 30 will send LDR 58 to revert back to the D-channel. Alternatively, the threshold parameters may be based on the amount of time it would take to clear the buffers (not shown) of computer 12 or ISP 30, as shown in Table 1.7, in the same manner described for Table 1.6.

The invention recognizes that once the default threshold parameters of AO/DI card 14 have been replaced with new threshold parameters, ISP 30 may then continue to send new threshold parameters to replace the then-current threshold parameters of AO/DI card 14, based on the changing status of telephone circuits in circuit switched network 18. The invention also recognizes that many end users may be connected to circuit switched network 18.

The software, which implements many aspects of the present invention, can be stored on a medium. The medium can be magnetic, such as in the form of a diskette, tape or fixed disk, or optical, such as a CD-ROM. Alternatively, the software can be supplied via the Internet or some type of private data network.

While the invention has been described with reference to a specific embodiment thereof, it will be appreciated that numerous variations, modifications, and embodiments are possible, and accordingly, all such variations, modifications, and embodiments are to be regarded within the spirit and scope of the invention.

What is claimed is:

1. A method of changing threshold parameters of an Always-On-Dynamic Integrated Services Digital Network (AO/DI) card integrated with a computer containing said AO/DI card, comprising the steps of:
    a) determining new threshold parameters for replacing the threshold parameters of said AO/DI card of said computer;
    b) sending said new threshold parameters to said computer; and
    c) replacing the threshold parameters of said AO/DI card with said new threshold parameters.

2. The method according to claim 1, frter comprising the step of determining the status of telephone circuits serving said computer.

3. The method according to claim 2, further comprising the step of determining said new threshold parameters based on the status of said telephone circuits.

4. The method according to claim 3, further comprising the step of utilizing ISP equipment for determining the status of said telephone circuits.

5. The method according to claim 4, further comprising the step of utilizing said ISP equipment for determining said new threshold parameters.

6. The method according to claim 5, further comprising the step of utilizing said ISP equipment for building a protocol containing said new threshold parameters, whereby said protocol is sent to said AO/DI card to replace the threshold parameters of said AO/DI card with said new threshold parameters.

7. The method according to claim 6, further comprising the step of sending a bandwidth-on-demand-threshold-updatemessage to said AO/DI card.

8. The method according to claim 7, further comprising the step of sending a bandwidth-on-demand-threshold-update-response message to said ISP equipment.

9. The method according to claim 2, further comprising the step of utilizing a network management center for determining the status of said telephone circuits, whereby the status of said telephone circuits is sent to ISP equipment.

10. The method according to claim 9, further comprising the step of utilizing said ISP equipmentto determine said new threshold parameters.

11. The method according to claim 10, further comprising the step of utilizing said ISP equipment for building a protocol containing said new threshold parameters, whereby said protocol is sent to said AO/DI card to replace the threshold parameters of said AO/DI card with said new threshold parameters.

12. The method according to claim 11, further comprising the step of sending a bandwidth-on-demand-threshold-updatemessage to said AO/DI card.

13. The method according to claim 12, further comprising the step of sending a bandwidth-on-demand-threshold-update-response message to said ISP equipment.

14. The method according to claim 2, further comprising the step of utilizing a network management center to determine both the status of said telephone circuits and said new threshold parameters.

15. The method according to claim 14, further comprising the step of utilizing said network management center to send said new threshold parameters to ISP equipment.

16. The method according to claim 15, further comprising the step of utilizing said ISP equipment for building a protocol containing said new threshold parameters, whereby said protocol is sent to said AO/DI card to replace the threshold parameters of said AO/DI card with said new threshold parameters.

17. The method according to claim 16, further comprising the step of sending a bandwidth-on-demand-threshold-updatamessage to said AO/DI card.

18. The method according to claim 17, further comprising the step of sending a bandwidth-on-demand-threshold-update-response message to said ISP equipment.

19. A method of changing threshold parameters of Internet Service Provider (ISP) equipment, comprising the steps of:

a) determining new threshold parameters to replace the threshold parameters of said ISP equipment;
b) sending said new threshold parameters to said ISP equipment; and
c) replacing the threshold parameters of said ISP equipment with said new threshold parameters.

20. The method according to claim 19, further comprising the step of determining the status of telephone circuits serving said ISP equipment.

21. The method according to claim 20, further comprising the step of utilizing a network management center for determining the status of said telephone circuits.

22. The method according to claim 21, further comprising the step of utilizing said network management center for notifying said ISP equipment of the status of said telephone circuits.

23. The method according to claim 22, further comprising the step of utilizing said ISP equipment for determining said new threshold parameters.

24. The method according to claim 23, further comprising the step of utilizing said ISP equipment for replacing the threshold parameters of said ISP equipment with said new threshold parameters.

25. The method according to claim 24, further comprising the step of sending a Network OK message to said ISP equipment.

26. The method according to claim 25, further comprising the step of sending a Network OK response message to said network management center.

27. The method according to claim 26, further comprising the step of sending a Network Problem message to said ISP equipment.

28. The method according claim 27, further comprising the step of sending a Network Problem response message to said network management center.

29. The method according to claim 28, further comprising the step of sending a Partial Network Problem message to said ISP equipment.

30. The method according to claim 29, further comprising the step of sending a Partial Network Problem response message to said network management center.

31. The method according to claim 24, further comprising the step of utilizing said ISP equipment for building a protocol containing said new threshold parameters, whereby said protocol is sent to an AO/DI card integrated with a computer to replace the threshold parameters of said AO/DI card with said new threshold parameters.

32. The method according to claim 21, further comprising the steps of utilizing said network management center for determining said new threshold parameters, and utilizing said network management center for sending said new threshold parameters to said ISP equipment, whereby said new threshold parameters are used to replace said threshold parameters of said ISP equipment.

33. The method according to claim 32, further comprising the step of utilizing said ISP equipment for building a protocol containing said new threshold parameters, whereby said protocol is sent to an AO/DI card integrated with a computer to replace the threshold parameters of said AO/DI card with said new threshold parameters.

34. The method according to claim 33, further comprising the step of sending a bandwidth-on-demand-threshold-updatemessage to said AO/DI card.

35. The method according to claim 34, further comprising the step of sending a bandwidth-on-demand-threshold-update-response message to said ISP equipment.

36. A communications system for changing threshold parameters of an Always-On-Dynamic Integrated Services Digital Network (AO/DI) card integrated with a computer containing said AO/DI card, comprising:
a) means for determining new threshold parameters to replace the threshold parameters of said AO/DI card of said computer;
b) means for sending said new threshold parameters to said computer; and
c) means for replacing the threshold parameters of said AO/DI card with said new threshold parameters.

37. The communications system of claim 36, further comprises means for determining the status of telephone circuits serving said computer.

38. The communications system of claim 37, further comprises means for determining said new threshold parameters based on the status of said telephone circuits.

39. The communications system of claim 38, further comprises means for building a protocol containing said new threshold parameters, whereby said protocol is sent to said AO/DI card to replace said threshold parameters of said AO/DI card with said new threshold parameters.

40. The communications system of claim 39, further comprises means for sending a bandwidth-on-demand-threshold-updatemessage to said AO/DI card.

41. The communications system of claim 40, further comprises means for sending a bandwidth-on-demand-threshold-update-responsemessage to said ISP equipment.

42. A communications system for changing threshold parameters of Internet Service Provider (ISP) equipment, comprising:
a) means for determining new threshold parameters to replace said threshold parameters of said ISP equipment;
b) means for sending said new threshold parameters to said ISP equipment; and
c) means for replacing the threshold parameters of said ISP equipment with said new threshold parameters.

43. The communications system of claim 42, further comprises means for determining the status of telephone circuits serving said ISP equipment.

44. The communications system of claim 43, further comprises means for sending the status of said telephone circuits to said ISP equipment.

45. The communications system of claim 44, further comprises means for building a protocol containing said new threshold parameters, whereby said protocol is sent to an AO/DI card integrated with a computer to replace the threshold parameters of said AO/DI card with said new threshold parameters.

46. A computer program product for changing threshold parameters of an Always-On-Dynamic Integrated Services Digital Network (AO/DI) card integrated with a computer containing said AO/DI card, the computer program product having medium with the computer program embodied thereon, the computer program comprising:
a) computer product code for determining new threshold parameters to replace the threshold parameters of said AO/DI card of said computer;
b) computer product code for sending said new threshold parameters to said computer; and
c) computer product code for replacing the threshold parameters of said AO/DI card with said new threshold parameters.

47. The computer program product of claim 46, wherein the computer program product further comprises computer product code for determining the status of telephone circuits serving said computer.

48. The computer program product of claim 47, wherein the computer program product further comprises computer product code for determining said new threshold parameters based on the status of said telephone circuits.

49. The computer program product of claim 48, wherein the computer program product further comprises computer product code for building a protocol containing said new threshold parameters, whereby said protocol is sent to said AO/DI card to replace the threshold parameters of said AO/DI card with said new threshold parameters.

50. The computer program product of claim 49, wherein the computer program product further comprises computer product code for sending a bandwidth-on-demand-threshold-updatemessage to said AO/DI card.

51. The computer program product of claim 50, wherein the computer program product further comprises computer product code for sending a bandwidth-on-demand-threshold-update-responsemessage to said ISP equipment.

52. A computer program product for changing threshold parameters of Internet Service Provider (ISP) equipment, the computer program product having a medium with the computer program embodied thereon, the computer program comprising:
   a) computer product code for determining new threshold parameters to replace the threshold parameters of said ISP equipment;
   b) computer product code for sending said new threshold parameters to said ISP equipment; and
   c) computer product code for replacing the threshold parameters of said ISP equipment with said new threshold parameters.

53. The computer program product of claim 52, wherein the computer program product further comprises computer product code for determining the status of telephone circuits serving said ISP equipment.

54. The computer program product of claim 53, wherein the computer program product further comprises computer program code for notifying said ISP equipment of the status of said telephone circuits of said circuit switched network.

55. The computer program product of claim 54, wherein the computer program product further comprises computer product code for determining said new threshold parameters based on the status of said telephone circuits.

56. The computer program product of claim 55, wherein the computer program product further comprises computer product code for sending a Network OK message to said ISP equipment.

57. The computer program product of claim 56, wherein the computer program product further comprises computer product code for sending a Network OK response message to said network management center.

58. The computer program product of claim 57, wherein the computer program product further comprises computer product code for sending a Network Problem message to said ISP equipment.

59. The computer program product of claim 58, wherein the computer program product further comprises computer product code for sending a Network Problem response message to said network management center.

60. The computer program product of claim 59, wherein the computer program product further comprises computer product code for sending a Partial Network Problem message to said ISP equipment.

61. The computer program product of claim 60, wherein the computer program product further comprises computer product code for sending a Partial Network Problem response message to said network management center.

62. A communications system for updating threshold parameters of an Always-On-Dynamic Integrated Services Digital Network (AO/DI) card integrated with a computer, comprising:
   a) a circuit switched network having an end office with a network management center;
   b) a packet switched network having a packet handler connected to both said end office and said computer; and
   c) an Internet Service Provider (ISP) connected to both said packet handler and said end office, said network management center providing information to said ISP, updating said ISP of the status of telephone circuits in said circuit switched network serving said computer and said ISP, said ISP determining new threshold parameters for said AO/DI card, whereby said new threshold parameters are sent to said AO/DI card automatically replacing the threshold parameters of said AO/DI card with said new threshold parameters.

63. A communications system for changing threshold parameters, comprising:
   a) an Always-On-Dynamic Integrated Services Digital Network (AO/DI) card;
   b) a computer containing said AO/DI card;
   c) a circuited switched network containing telephone circuits serving said computer, means for determining new threshold parameters to replace the threshold parameters of said AO/DI card;
   d) means for sending said new threshold parameters to said computer; and
   e) means for replacing the threshold parameters of said AO/DI card with said new threshold parameters.

* * * * *